July 26, 1938.                J. C. CROWLEY                 2,124,909
                                VALVE STEM
                            Filed April 27, 1935

INVENTOR.
JOHN C. CROWLEY
BY
Kwis, Hudson & Kent
ATTORNEYS.

Patented July 26, 1938

2,124,909

UNITED STATES PATENT OFFICE 2,124,909

VALVE STEM

John C. Crowley, Cleveland Heights, Ohio, assignor to The Dill Manufacturing Company, Cleveland, Ohio, a corporation of Ohio Application April 27, 1935, Serial No. 18,650

2 Claims. (Cl. 152—430)

This invention relates to a valve stem such as is used in the inner tube of a pneumatic tire, although, of course, valve stems of this character are often employed in other inflatable articles.

An object of the invention is to provide a valve stem which is so constructed that when pressure fluid is passed through the stem into the article carrying the same, the said fluid will be diffused laterally as it leaves the inner end of the stem bore as distinguished from passing straight out of the bore in a single concentrated stream or jet.

Another object is to provide a valve stem which is so constructed at the base that when the stem is molded into a tire tube and the tube is cured by high pressure steam, such steam will be exhausted into the tube out of the side of the valve stem base thereby causing a circulation in one direction of said steam during the curing operation.

Another object is to provide a valve stem having a rubber or other base which can be vulcanized or molded to the article carrying the stem and which is so constructed that when pressure fluid is passed through the stem into the article the said fluid will be diffused laterally as it leaves the inner end of the stem bore as distinguished from passing straight out of the bore in a single concentrated stream or jet.

A further object is to provide a valve stem the base of which is of rubber or similar material and is so constructed that when it is molded to a tire tube and the stem is used during the curing operation for the tube for the passage of high pressure air or steam into the tube such air or steam will be diffused or deflected laterally as it leaves the inner end of the valve stem bore and will not form thin spots in the tube.

A further object is to provide a valve stem having a rubber base in which the rubber forming the base also forms a deflector means whereby the fluid used in the curing of the tire tube to which the stem is attached circulates in one direction during the curing operation.

Further and additional objects and advantages of the invention will become apparent hereinafter during the following detailed description of several embodiments thereof, which embodiments are illustrated in the accompanying drawing wherein.

The inner tubes of pneumatic tires are, at the present time, generally manufactured by a continuous molding process wherein the valve stems for the tubes have their bases molded to the tubes during the manufacturing process. The molded tubes are cured by inflating the same with high pressure air or steam while the tubes are still hot and are in the molds.

The injection of the high pressure fluid into the tubes through the valve stems causes a jet or concentrated stream of the fluid to leave the inner end of the valve stem bore and strike the inner surface of the tube directly opposite the base of the valve stem. This jet or stream of high pressure fluid striking the still hot uncured rubber of the tube forces the rubber to flow away from the point at which the jet strikes the tube and results in creating a thin weakened spot in the tube which is liable to subsequently blow out when the tube is used in a pneumatic tire.

The present invention contemplates the provision of a valve stem having a rubber or other base which can be molded or vulcanized to the tube and which is so constructed that the pressure fluid leaving the valve stem bore will be diffused or deflected laterally as distinguished from the objectionable straight emitting concentrated stream or jet, wherefore the formation of thin spots in the tire tube is eliminated.

Figure 1:
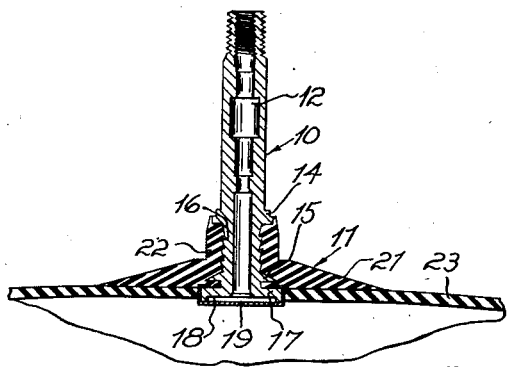
Fig. 1 is a transverse sectional view through a valve stem and its base applied to a tire tube, and illustrates an embodiment of the invention in one of its forms.
Figure 2:
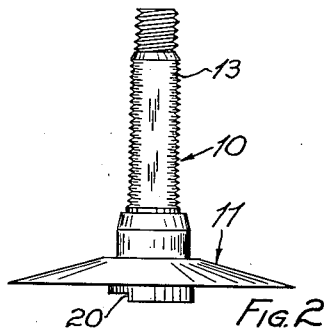
Fig. 2 is an elevational view of the valve stem shown in Fig. 1.

In Figs. 1 and 2 of the drawing the valve stem comprises a stem 10 and a base 11. The stem 10 is formed of metal and is provided with the usual bore 12 shaped and threaded to receive the customary valve insides while the outside of the stem is threaded, as indicated at 13 in Fig. 2, for a portion of its length to receive a valve or dust cap.

The stem 10 below the threaded portion 13 is provided with a laterally extending annular flange 14 and at a point spaced below said flange with a second flange 15. The stem 10 intermediate the flanges 14 and 15 has a series of upwardly and outwardly directed tooth-like annular projections 16. An enlarged head-like portion 17 is formed on the end of the stem below the flange 15 and is provided on its outer side with a recess or counterbore 18 communicating with the bore 12 in the stem.

A thin sheet metal end plate 19 extends across the portion 17 and covers the recess 18 and has its peripheral edges bent up and over the portion 17 to secure the end plate thereto. A portion of the plate 19 and of the head 17 is cut away, as indicated at 20, to provide a laterally directed opening communicating with the bore of the valve stem.

The base 11 is formed of rubber and has an enlarged conical portion 21 and a central outwardly extending cylindrical portion 22. The base 11 is molded to the stem 10 and has a secure interlock therewith due to the flanges 14 and 15, head portion 17 and projections 16. It will be noted that the base 11 when molded to the stem covers the inturned edge of the end plate 19 which retains said plate in position.

The base 11 is molded or vulcanized to a tire tube 23, as shown in Fig. 1, with the head portion 17 and end plate 19 extending through an opening in the tube. It will be seen that when air or steam is passed through the bore 12 of the stem it will be deflected laterally through the opening 20 into the tire tube.

Figure 3:
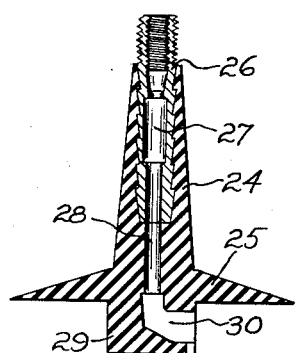
Fig. 3 is a transverse sectional view through a so-called "rubber" valve stem and illustrates a different embodiment of the invention from that shown in Figs. 1 and 2.
Figure 4:
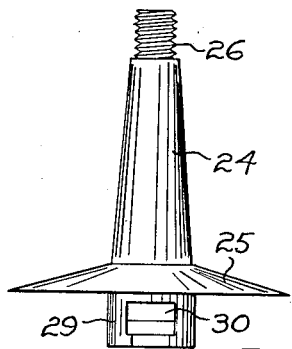
Fig. 4 is an elevational view of the valve stem shown in Fig. 3.

In Figs. 3 and 4 there is shown a valve stem comprising a tapered rubber stem 24 having at its large end an integral base 25 adapted to be vulcanized or molded to a tire tube. The customary metal insert 26 for the valve insides and valve cap is molded in the stem 24. The insert is provided with a bore 27 communicating with a bore 28 in the stem 24 and base 25.

The base 25 is of general conical configuration and has on its outer or under side an integral centrally arranged extension 29 which when the base is secured to a tire tube extends through an opening in the tube. The extension 29 is provided with a passage 30 communicating with the bore 28 and having a laterally extending portion adapted to communicate with the interior of a tire tube.

It will be seen that when air or steam is passed through the insert 26 and stem 24 it will be deflected laterally through the passage 30 into the tire tube.

Figure 5:
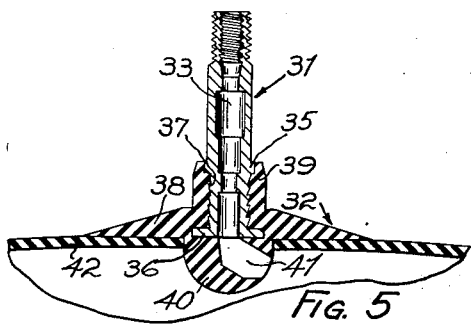
Fig. 5 is a transverse sectional view through a valve stem and its base when secured to a tire tube and illustrates a different embodiment of the invention from those shown in any of the preceding figures.
Figure 6:
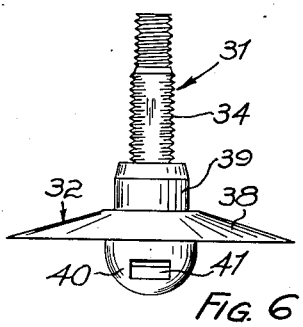
Fig. 6 is an elevational view of the valve stem shown in Fig. 5.

Referring to Figs. 5 and 6 there is shown a valve stem comprising a metal stem 31 and a rubber base 32. The stem 31 is provided with the usual bore 33 shaped and threaded to receive the customary valve insides, while the outside of the stem is threaded for a portion of its length, as indicated at 34 in Fig. 6, to receive a valve or dust cap.

The stem 31 below the threaded portion 34 is provided with a laterally extending flange 35 and at its end with a second and larger laterally extending flange 36. The stem 31 intermediate the flanges 35 and 36 has a series of upwardly and outwardly directed tooth-like annular projections 37.

The rubber base 32 has an enlarged conical shaped portion 38 and a centrally disposed outwardly extending cylindrical portion 39. The base 32 is molded to the stem 31 and is securely interlocked therewith by the flanges 35 and 36 and the projections 37.

The base 32 has on its under or outer side a centrally located knob-like spherical extension 40 which is provided with a passage 41 communicating with the bore 33 and extending diagonally outwardly of the extension 40. When the base 38 is secured to a tire tube 42 the extension 40 extends through the usual opening in the tube and it will be seen that when air or steam is passed through the stem it will be deflected laterally through the passage 41 into the tire tube.

It will be seen that all of the embodiments present constructions such that the air or steam passed through the stems will be deflected laterally into the tire tubes and will not impinge spots in the tubes in concentrated streams. Thus the formation of thin spots in the tubes is eliminated. Valve stems equipped with the present invention reduce the number of tire tubes which must be either discarded or rated as seconds because of thin spots and thus enable a more economical and efficient manufacture of tubes, as well as the provision of tubes which will be stronger and provide greater service in actual use.

The valve stems are economical to manufacture since the means for deflecting the air or stream are readily applied or are molded integral with the rubber bases.

The extensions on the central inner side of the bases, in addition to providing the means for deflecting the fluid pressure, also act to centralize the bases with respect to the openings in the tire tubes.

Tubes equipped with valve stems embodying the invention and having deflecting and circulating means at their bases can be cured with internal steam pressure, by which process it has been found a more uniform cure of the tube can be accomplished.

Although several embodiments of the invention have been illustrated and described herein, it should be understood that the invention is susceptible of various modifications and adaptations within the scope of the appended claims.

Having thus described my invention I claim:

1. A valve stem having a bore therethrough and provided with a rubber base adapted to be secured to a tire tube with the stem projecting outwardly of the tube and adapted to have valve means arranged therein outwardly of the tube, said base being provided on its inner side with an integral centrally arranged extension adapted to project into the tube through an opening therein and having a constantly open passage therein always in communication with said bore and extending laterally therefrom to communicate with the interior of said tube.

2. A valve stem having a bore therethrough and provided with a rubber base adapted to be secured to a tire tube, said base being provided on its inner side with an integral centrally arranged extension adapted to project through an opening in the tube and having a constantly open passage therein always in communication with said bore and extending laterally therefrom to communicate with the interior of said tube.

JOHN C. CROWLEY.